(12) United States Patent
Wang et al.

(10) Patent No.: US 12,493,136 B2
(45) Date of Patent: Dec. 9, 2025

(54) METHOD AND DEVICE FOR PREDICTING REMAINING OIL DISTRIBUTION BASED ON HISTORICAL AND PREDICTIVE RESERVOIR KNOWLEDGE

(71) Applicants: Beijing Sanotech Co., Ltd, Beijing (CN); University of Science & Technology Beijing, Beijing (CN)

(72) Inventors: Jiulong Wang, Beijing (CN); Liying Song, Beijing (CN); Jingwei Zhu, Beijing (CN); Hongqing Song, Beijing (CN); Shuyi Du, Beijing (CN)

(73) Assignees: BEIJING SANOTECH CO., LTD, Beijing (CN); UNIVERSITY OF SCIENCE & TECHNOLOGY BEIJING, Beijing (CN)

( * ) Notice: Subject to any disclaimer, the term of this patent is extended or adjusted under 35 U.S.C. 154(b) by 512 days.

(21) Appl. No.: 17/971,074

(22) Filed: Oct. 21, 2022

(65) Prior Publication Data

US 2023/0266499 A1 Aug. 24, 2023

(30) Foreign Application Priority Data

Feb. 21, 2022 (CN) .......................... 202210158923.4

(51) Int. Cl.
*G01V 20/00* (2024.01)
*G06N 3/08* (2023.01)

(52) U.S. Cl.
CPC .............. *G01V 20/00* (2024.01); *G06N 3/08* (2013.01)

(58) Field of Classification Search
None
See application file for complete search history.

(56) References Cited

U.S. PATENT DOCUMENTS

2012/0191353 A1* 7/2012 Wilt ........................ G06F 30/23
702/6
2019/0196039 A1* 6/2019 Wilson ...................... G01V 3/30

FOREIGN PATENT DOCUMENTS

CN 110630244 A * 12/2019 ............. E21B 47/00

OTHER PUBLICATIONS

English machine translation of CN 110630244 A (Year: 2019).*

* cited by examiner

*Primary Examiner* — Walter L Lindsay, Jr.
*Assistant Examiner* — Geoffrey T Evans
(74) *Attorney, Agent, or Firm* — Venable LLP

(57) ABSTRACT

The present disclosure provides a method and device for predicting remaining oil distribution based on historical and predictive reservoir knowledge. The method includes: establishing complete data sets according to relevant historical dynamic and static monitor data of oil wells in a target reservoir; training and testing a long and short-term memory (LSTM) model using the complete data sets; predicting production of a single well at a preset moment by using the trained LSTM model; acquiring three-phase saturations of the single well at the preset moment based on the production predicting results and experience of reservoir experts; and according to the three-phase saturations of the single well, setting boundary conditions and physical constraints for the reservoir, and deriving an oil-gas-water three-phase saturation field at the preset moment using Kriging interpolation to obtain a prediction result of remaining oil distribution in the target reservoir.

14 Claims, 5 Drawing Sheets

METHOD AND DEVICE FOR PREDICTING REMAINING OIL DISTRIBUTION BASED ON HISTORICAL AND PREDICTIVE RESERVOIR KNOWLEDGE

CROSS REFERENCE TO RELATED APPLICATION

This patent application claims the benefit and priority of Chinese Patent Application No. 202210158923.4, filed on Feb. 21, 2022, the disclosure of which is incorporated by reference herein in its entirety as part of the present application.

TECHNICAL FIELD

The present disclosure relates to the technical field of petroleum exploitation, in particular to a method and device for predicting remaining oil distribution based on historical and predictive reservoir knowledge.

BACKGROUND ART

Grasping remaining oil distribution has always been an important means to improve oil recovery in the middle and late development stage of a reservoir. However, under the influence of reservoir heterogeneity, the dispersion degree of remaining oil has become all the more intensified, and the distribution characteristics tend to be increasingly complex, which adds to the uncertainty in the work of distribution prediction.

In related techniques, artificial intelligence (AI) is commonly used to calculate the remaining oil distribution. Such method is intended to grid the reservoir and establish an SVM classification model to judge whether water breakthrough occurs in any of the grid cells, and build a deep learning model for predicting oil and water distribution based on long and short-term memory (LSTM) networks, thereby realizing the prediction of remaining oil distribution.

However, it requires a large workload of data preprocessing in the earlier stage, and each grid cell has to be calculated separately, which leads to low prediction efficiency.

SUMMARY

The technical problem to be solved by the present disclosure is to provide a method and device for predicting remaining oil distribution based on historical and predictive reservoir knowledge, with the aim of resolving the problem that it requires a large workload of data preprocessing in the earlier stage, and each grid cell has to be calculated separately, which leads to low prediction efficiency.

To resolve the above technical problem, the present disclosure provides the following technical solutions.

On one hand, the present disclosure provides a method for predicting remaining oil distribution based on historical and predictive reservoir knowledge, including:
  establishing complete data sets according to relevant historical dynamic and static monitor data of oil wells in a target reservoir;
  training and testing a long and short-term memory (LSTM) model using the complete data sets;
  predicting production of a single well at a preset moment by using the trained LSTM model;
  acquiring three-phase saturations of the single well at the preset moment based on the production predicting results and experience of reservoir experts; and
  according to the three-phase saturations of the single well, setting boundary conditions and physical constraints for the reservoir, and deriving an oil-gas-water three-phase saturation field at the preset moment using Kriging interpolation to obtain a prediction result of remaining oil distribution in the target reservoir.

In an optional embodiment, the process of establishing complete data sets according to relevant historical dynamic and static monitor data of oil wells in a target reservoir includes:
  acquiring historical dynamic and static data monitored from the field of the target reservoir to form initial data sets; and
  cleaning the initial data sets according to the experience of reservoir experts to acquire the dynamic and static monitor data sets of the target reservoir.

In an optional embodiment, the process of establishing complete data sets according to relevant historical dynamic and static monitor data of oil wells in a target reservoir includes:
  completing historical wellhead pressure data of a single well by using a function fitting method;
  completing, according to a Bernoulli equation and analysis of change in reservoir formation pressure, historical bottom hole pressure data of the single well;
  completing historical pressure field distribution data of blocks by using a Kriging method;
  completing historical phase saturation data of the single well according to a relative permeability curve and flow analysis of formation fluid; and
  completing historical saturation distribution data of blocks by using a Kriging method.

In an optional embodiment, the process of establishing complete data sets according to relevant historical dynamic and static monitor data of oil wells in a target reservoir includes:
  completing, from two aspects of well opening and well shut-in, historical bottom hole pressure data of a single well according to a Bernoulli equation and analysis of change in reservoir formation pressure;
  considering whether the on-way resistance loss of fluid flow can be ignored and the setting of boundary conditions for blocks, and completing historical pressure field distribution data of blocks by using a Kriging method;
  simplifying a percolation process of a horizontal well to plane radial flow and spherical centripetal flow, and a percolation process of a vertical well to plane radial flow, and completing, from two aspects of well opening and well shut-in, historical phase saturation data of a single well according to a relative permeability curve and flow analysis of formation fluid; and
  on the basis of the boundary conditions and physical constraints, introducing the influence of logging saturation data, and completing historical saturation distribution data of blocks by using the Kriging method.

In an optional embodiment, the process of establishing complete data sets according to relevant historical dynamic and static monitor data of oil wells in a target reservoir includes:
  normalizing the relevant historical dynamic and static monitor data of oil wells in the target reservoir, and establishing the complete data sets according to the normalized relevant historical dynamic and static monitor data of oil wells in the target reservoir.

In an optional embodiment, the process of establishing complete data sets according to relevant historical dynamic and static monitor data of oil wells in a target reservoir includes:

dividing the complete data sets to obtain a preset proportion of data sets as training sets, and the rest proportion of data sets as remaining test sets.

In an optional embodiment, the process of acquiring three-phase saturations of the single well at the preset moment based on the production predicting results and experience of reservoir experts includes:

acquiring three-phase saturations of the single production well at the preset moment based on the production predicting results and experience of reservoir experts.

In an optional embodiment, the process of acquiring three-phase saturations of the single well at the preset moment based on the production predicting results and experience of reservoir experts further includes:

judging well shut-in/well opening and injection conditions of an injection well at the preset moment according to a reservoir development management plan, and acquiring the three-phase saturations of the single injection well at the preset moment according to reservoir analysis.

In an optional embodiment, the process of acquiring three-phase saturations of the single well at the preset moment based on the production predicting results and experience of reservoir experts further includes:

according to the three-phase saturations of the single production well at the preset moment, as well as three-phase saturations of the single injection well at the preset moment, setting boundary conditions and physical constraints, and deriving the oil-gas-water three-phase saturation field at the preset moment using Kriging interpolation.

On the other hand, the present disclosure provides a device for predicting remaining oil distribution based on historical and predictive reservoir knowledge, where the device includes a readable storage medium having a computer program stored therein, and the computer program is configured to implement the method according to any one of the foregoing methods.

The method provided in the embodiments of the present disclosure at least has the following beneficial effects:

According to the embodiment of the present disclosure, based on historical dynamic reservoir knowledge, static reservoir data and predictive reservoir information, and in combination with deep learning technology and traditional interpolation method, the present disclosure provides a method by which remaining oil distribution can be efficiently and accurately predicted in an explainable manner. Being an important part in the process of deriving remaining oil distribution by interpolation, this method, based on physical laws and experience of reservoir experts, and in combination with incomplete and discrete reservoir-related monitor data, allows to obtain more reservoir information, which provides complete and robust data support for prediction of remaining oil distribution.

BRIEF DESCRIPTION OF THE DRAWINGS

FIG. 3A shows the prediction results and FIG. 3B shows the benchmark results;

FIG. 4A shows prediction results and FIG. 4B shows the benchmark results; FIG. 5A shows prediction results and FIG. 5B shows the benchmark results.

DETAILED DESCRIPTION OF THE EMBODIMENTS

To make the to-be-solved technical problems, technical solutions, and advantages of the present disclosure clearer, the present disclosure will be described in detail below with reference to the accompanying drawings and specific embodiments.

A classical flow unit analysis method is low in prediction accuracy. In view of this defect, on the basis of deep learning technology emerging in recent years and classical interpolation algorithms, a data-driven method is established to predict remaining oil distribution. In most cases, however, a deep learning model does not consider any prior knowledge, including physical equations and expertise, making the model itself identified as an unexplainable 'black box'. An interpolation algorithm refers to an algorithm which derives unknown point data based on prior data points. Therefore, prior knowledge, the physical laws concerned in particular, is of vital importance to the data-driven method. On one hand, such prior knowledge helps to deduce more reservoir information, thus introducing a correct solution to the deep learning model and interpolation algorithm. On the other hand, it can help to constrain a single data-driven model, so as to enhance the robustness and interpretability of the model. With the new thought of combining a deep learning model and a classical algorithm, and with the company of physical constraints, an "implicit relation" between data input and output can be fully mined, which provides a highly potential method for predicting remaining oil distribution. In view of this, the embodiments of the present disclosure provide a method for predicting remaining oil distribution based on historical and predictive reservoir knowledge, with the aim of resolving the foregoing technical problems.

Figure 1:
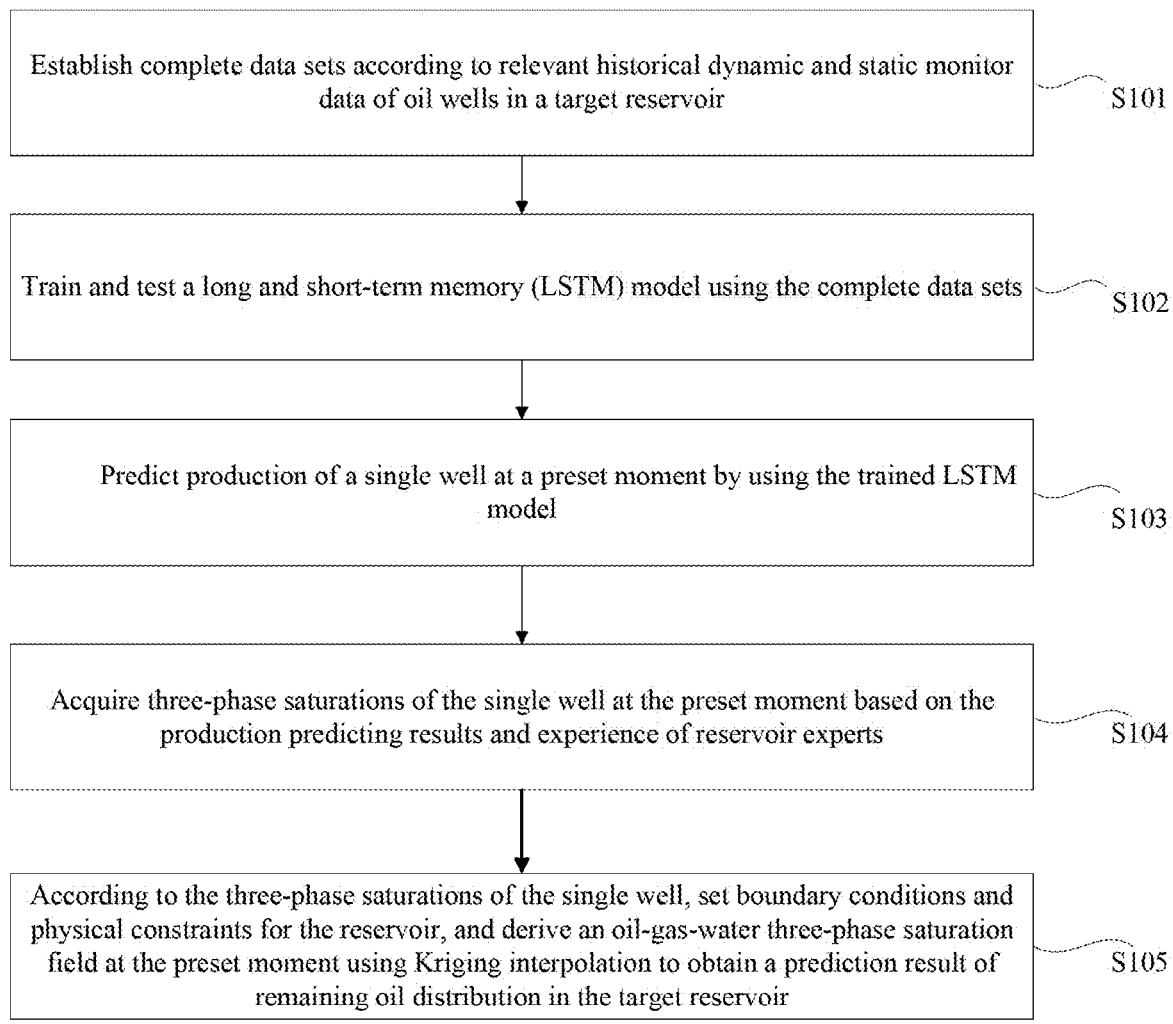
FIG. 1 is a flowchart of a method for predicting remaining oil distribution based on historical and predictive reservoir knowledge.
Figure 2:
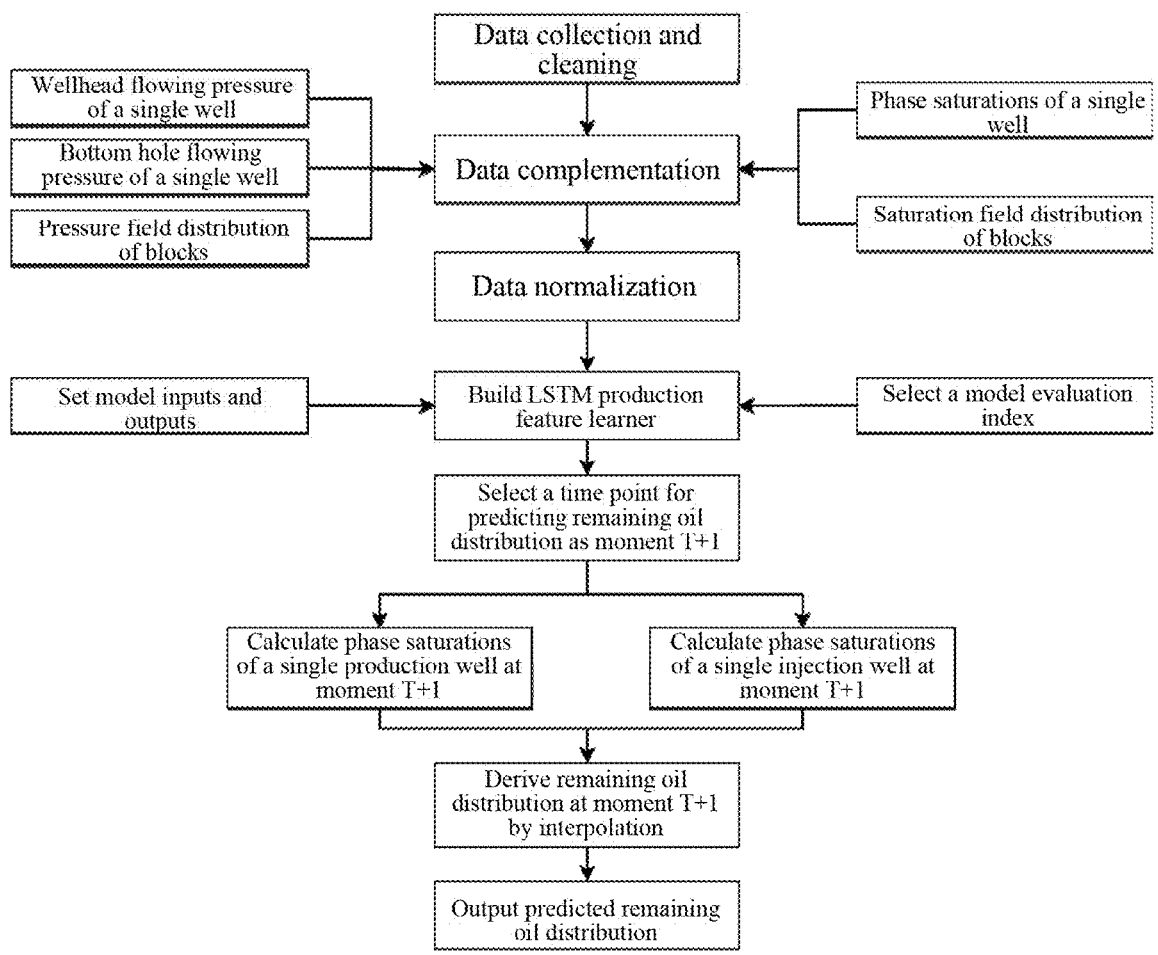
FIG. 2 is a simplified flowchart of a method for predicting remaining oil distribution based on historical and predictive reservoir knowledge.

On one hand, referring to FIG. 1 and FIG. 2, FIG. 1 is a flowchart of a method for predicting remaining oil distribution based on historical and predictive reservoir knowledge; and FIG. 2 is a simplified flowchart of a method for predicting remaining oil distribution based on historical and predictive reservoir knowledge. The method includes the following steps:

S101, establish complete data sets according to relevant historical dynamic and static monitor data of oil wells in a target reservoir.

S102, train and test a long and short-term memory (LSTM) model using the complete data sets.

S103, predict production of a single well at a preset moment by using the trained LSTM model.

S104, acquire three-phase saturations of the single well at the preset moment based on the production predicting results and experience of reservoir experts.

S105, according to the three-phase saturations of the single well, set boundary conditions and physical constraints for the reservoir, and derive an oil-gas-water three-phase saturation field at the preset moment using Kriging interpolation to obtain a prediction result of remaining oil distribution in the target reservoir.

The method provided in the embodiments of the present disclosure at least has the following beneficial effects:

According to the embodiment of the present disclosure, based on historical dynamic reservoir knowledge, static reservoir data and predictive reservoir information, and in combination with deep learning technology and traditional interpolation method, the present disclosure provides a method by which remaining oil distribution can be efficiently and accurately predicted in an explainable manner. Being an important part in the process of deriving remaining oil distribution by interpolation, this method, based on physical laws and experience of reservoir experts, and in combination with incomplete and discrete reservoir-related monitor data, allows to obtain more reservoir information, which provides complete and robust data support for prediction of remaining oil distribution.

It should be noted that Kriging method refers to a regression algorithm of conducting spatial modeling and prediction on a random process/random field based on a covariance function. In specific random processes, such as inherently stationary process, Kriging method can give the best linear unbiased prediction (BLUP), and hence the name spatial BLUP in statistics.

The method provided in the embodiments of the present disclosure is further illustrated and described by way of optional embodiments.

S101, establish complete data sets according to relevant historical dynamic and static monitor data of oil wells in a target reservoir.

The dynamic and static monitor data provided in the embodiments of the present disclosure include, but not limited to: porosity distribution, permeability distribution, initial oil saturation distribution, effective reservoir thickness distribution, relative permeability curve, oil-water viscosity, etc.

In an optional embodiment, the process of establishing complete data sets according to relevant historical dynamic and static monitor data of oil wells in a target reservoir includes:

Acquire dynamic and static on-field monitor data of the target reservoir to form initial data sets.

Clean the initial data sets according to the experience of reservoir experts to acquire the dynamic and static monitor data sets of target reservoir.

Further, acquire dynamic and static monitor data from the field of the reservoir to form initial data sets. It should be noted that data errors often exist in the initial reservoir data. For example, a production well may have production but a choke size of 0, an injection well with no injection volume may yet have injection pressure, and same dynamic data may have repeated recording time but inconsistent data content. Therefore, it is required to clean these wrong data according to the experience of reservoir field experts. For a production well with production but the nozzle size is 0, the production data are modified to 0; for an injection well with injection pressure but no injection volume, the injection volume is modified to 0; for the same dynamic data with repeated recording time point but inconsistent data content, only the data that appeared for the first time are retained.

Data missing is also a problem existing in reservoir data. Therefore, it is necessary to complete the historical reservoir data based on physical laws.

In an optional embodiment, S101, the process of establishing complete data sets according to relevant historical dynamic and static monitor data of oil wells in a target reservoir includes:

S1011, complete historical wellhead pressure data of a single well by using a function fitting method.

Furthermore, complete historical wellhead flowing pressure data of a single well, analyze the distribution law of wellhead flowing pressure monitor data of a single well according to practical experience and physical background, and based on the monitor data, obtain a complete wellhead flowing pressure curve using the function fitting method. Further, complete the historical wellhead flowing pressure data of a single well according to the following formula:

$$f(x) = CurveFit\left(x_{t_1}^{WHFP}, x_{t_2}^{WHFP}, \ldots, x_{t_n}^{WHFP}\right)$$

Where $x_{t_i}^{WHFP}$ denotes wellhead flowing pressure monitor data of a single well at a time point $t_i^{WHFP}$, $i \in [1, n]$, $n \in N^*$. Fitting precision of the function $f(x)$ is evaluated using an evaluation index determination coefficient (R-Square, $R^2$), which is expressed as:

$$R^2 = 1 - \frac{\sum_{i=1}^{N}\left(Y_i^{data} - Y_i^{pred}\right)^2}{\sum_{i=1}^{N}\left(Y_i^{data} - \overline{Y}\right)^2}$$

Where $Y_{data}^{i}$ denotes a monitored value of an ith sample, $Y_{pred}^{i}$ denotes a fitted value, Y denotes a mean value of $Y_{pred}^{i}$, and N denotes a total sample size.

For the monitoring point of which the monitored value is not on the fitted curve, the value thereof on the fitted curve is replaced with a monitored value:

$$P_{Head}(x) = Replace\left(f(x) \mid x_{t_1}^{WHFP}, x_{t_2}^{WHFP}, \ldots, x_{t_n}^{WHFP}\right)$$

Where $P_{Head}(x)$ denotes a continuous wellhead flowing pressure curve with monitor data retained.

It should be noted that the function fitting methods provided in the embodiments of the present disclosure include, but not limited to, linear fitting, polynomial fitting, Gaussian fitting, power exponential fitting, etc., and prior to selecting a specific fitting method, it is necessary to analyze the distribution law of wellhead pressure monitoring values. Taking $R^2$ as the evaluation standard, the fitting method with the largest fitted value $R^2$ is selected.

S1012, complete, according to a Bernoulli equation and analysis of change in reservoir formation pressure, historical bottom hole pressure data of the single well. Further, complete, from two aspects of well opening and well shut-in, historical bottom hole pressure data of a single well according to a Bernoulli equation and analysis of change in reservoir formation pressure.

Further, complete historical bottom hole pressure data of a single well. The corresponding Bernoulli equation is as follows:

$$P_{Bottom} = P_{Head} + \rho_{Fluid} g H$$

Where $P_{Bottom}$ denotes a bottom hole flow pressure, $P_{Head}$ denotes a wellhead flowing pressure, $\rho_{Fluid}$ denotes fluid density, g denotes gravitational acceleration, and H denotes a well depth. Regardless of the influence of the pressure change in the process of fluid flow from the bottom hole to the surface, the calculation formula of fluid density is as follows:

$$\rho_{Fluid} = \frac{\sum_{j=1}^{J} \rho_j V_j}{\sum_{j=1}^{J} V_j}, J \in N^*$$

Where $\rho_j$ denotes density of a $j^{th}$ fluid, and $V_j$ denotes a volume of the $j^{th}$ fluid. When a well is in a well shut-in period, it is impossible to know the value of $V_j$, so it is necessary to complete the bottom hole flow pressure in the well shut-in period according to the experience of reservoir experts. The well shut-in time is expressed as follows:

$$t_k^{shut} \in \{t_0^{open}, t_1^{shut}, t_2^{shut}, \ldots t_K^{shut}, t_{K+1}^{open}\}, k \in [1,K], K \in N^*$$

Where $t_1^{shut}$ denotes a moment of well shut-in, and denotes a moment of well opening after well shut-in. According to the reservoir analysis, during the well shut-in, the bottom hole flow pressure of a production well will gradually increase up to the formation pressure value; and the bottom hole flow pressure of an injection well will gradually decrease to the formation pressure value at most. Since the bottom hole flow pressure at moment $t_{K+1}^{open}$ may be affected by human factors, such as control over the choke size, the bottom hole flow pressure at moment $t_{K+1}^{open}$ cannot accurately reflect the change of bottom hole flow pressure during the well shut-in period. The bottom hole flow pressure at moment $t_K^{shut}$ is used to reflect the change of bottom hole flow pressure during the well shut-in period, where the bottom hole flow pressure at moment $t_K^{shut}$ is the average pressure value of peripheral M wells at moment $t_K^{shut}$, and the formula is expressed as follows:

$$P_{Bottom, t_K^{shut}} = \frac{\sum_{m=1}^{M} P_{Bottom, t_K^{shut}}^m}{M}, M \in N^*$$

Where $P_{Bottom, t_K^{shut}}$ denotes a bottom hole flow pressure of a shut-in well at moment $t_K^{shut}$, and $P_{Bottom, t_K^{shut}}^m$ denotes a bottom hole flow pressure of an mth neighboring well of the shut-in well at moment $t_K^{shut}$. It is considered that the change of bottom hole flow pressure within the time period of $t_0^{open}$ and $t_K^{shut}$ is linear, so the isometric interpolation method is used to complete the bottom hole flow pressure data which are unknown during the well shut-in period. The formula is as follows:

$$P_{Bottom, t_k^{shut}} = P_{Bottom, t_0^{open}} + \frac{k\left(P_{Bottom, t_K^{shut}} - P_{Bottom, t_0^{open}}\right)}{K}.$$

In the formula, $P_{Bottom, t_k^{shut}}$ denotes a bottom hole flow pressure of a shut-in well at a time point $t_k^{shut}$, and $P_{Bottom, t_0^{open}}$ denotes a bottom hole flow pressure of the shut-in well at a time point $t_0^{open}$.

S1013, consider whether the on-way resistance loss of fluid flow can be ignored and the setting of boundary conditions for blocks, and complete historical pressure field distribution data of blocks by using a Kriging method.

Since the well trajectory of a horizontal well needs to be characterized by multiple sets of coordinates, it is required to consider whether the on-way resistance loss of fluid flow can be ignored in S1013.

Further, complete historical pressure field distribution data of blocks. Based on the bottom hole flow pressure data of each well, the pressure field distribution is obtained using Kriging method. Prior to interpolation, the constant pressure boundary condition is set, the formation pressure value is given, and the corresponding bottom hole flow pressure is given to the appropriate location according to well location coordinates of each well. For each of vertical wells, a set of coordinates is used to characterize the well location, without regard to the influence of well trajectory. For each of horizontal wells, multiple sets of coordinates are used to characterize the well location, with the influence of well trajectory taken into consideration. Therefore, it is necessary to judge whether the on-way resistance loss during the flow process of the fluid in the horizontal well can be ignored, where the formula for calculating the on-way resistance loss is as follows:

$$\Delta P = \begin{cases} \dfrac{128\mu Q L_{fluid}}{\pi d^4}, & \text{in the case of laminar flow} \\ \dfrac{64\mu Q L_{fluid}}{\pi d^4}, & \text{in the case of turbulent flow} \end{cases}$$

Where $\Delta P$ denotes on-way resistance loss, $\mu$ denotes dynamic viscosity, Q denotes flow, $L_{fluid}$ denotes a fluid flow distance, d denotes a wellhole diameter, and Re denotes a Reynolds number. If the calculated $\Delta P$ is much smaller than the bottom hole flow pressure, then the $\Delta P$ can be ignored, each set of coordinates of the horizontal well will be given the same bottom hole flow pressure value; if $\Delta P$ cannot be ignored, then according to the pressure drop direction of the actual well trajectory of the reservoir, the bottom hole flow pressure values of the multiple sets of coordinates change in an arithmetic progression, with a tolerance of $\Delta P$.

S1014, simplify a percolation process of a horizontal well to plane radial flow and spherical centripetal flow, and a percolation process of a vertical well to plane radial flow, and completing, from two aspects of well opening and well shut-in, historical phase saturation data of a single well according to a relative permeability curve and flow analysis of formation fluid. In the actual production process of a reservoir, the well is often shut-in, so the embodiments of the present disclosure complete the historical bottom hole pressure data of a single well from two aspects of well opening and well shut-in.

It should be noted that the relative permeability curve needs to made in combination with the actual situation of the reservoir. In other words, each single well may have its own relative permeability curve, or that the wells in a certain area share the same relative permeability curve.

Further, complete historical phase saturation data of a single well. The phase saturation data are completed according to the two factors of relative permeability curve and the sum of saturations of all phases is 1. For the production well, the fluid flow in the horizontal well is simplified to the plane radial flow in the horizontal section and the spherical centripetal flow at the tail end, and the radius of the spherical centripetal flow is considered to be much larger than the wellhole radius. Therefore, the calculation equation for the production of the horizontal well is as follows:

$$Q_{horizontal} = \frac{2\pi K L (P_e - P_{Bottom})}{\mu \ln\left(\dfrac{R_e}{R_w}\right)} + \frac{2\pi K R_w (P_e - P_{Bottom})}{\mu}$$

Where $Q_{horizontal}$ denotes a production equation of a horizontal well, K denotes permeability, L denotes a length of the horizontal well, $P_e$ denotes formation pressure, $R_e$ denotes a distance between an outer boundary and the wellhole, and $R_w$ denotes a wellhole radius. Plane radial flow is selected for the vertical well, so the production equation for the vertical well is as follows:

$$Q_{vertical} = \frac{2\pi KL(P_e - P_{Bottom})}{\mu \ln\left(\frac{R_e}{R_w}\right)}$$

According to the above two equations, the relative permeability of the $j^{th}$ phase fluid can be deduced as follows:

$$K_r = \begin{cases} \dfrac{\mu Q_{horizontal}}{2\pi K_a(P_e - P_{Bottom})\left(\dfrac{L}{\ln\left(\dfrac{R_e}{R_w}\right)} + R_w\right)}, \text{ in the case of a horizontal well} \\ \dfrac{\mu \ln\left(\dfrac{Re}{R_w}\right) Q_{vertical}}{2\pi LK_a(P_e - P_{Bottom})}, \text{ in the case of a vertical wall} \end{cases}$$

In the formula, $K_a$ denotes absolute permeability. After the relative permeability of the $j^{th}$ phase fluid is calculated, the saturation of the other phases can be obtained according to the phase permeability curve. Then, the phase saturation of the $j^{th}$ phase fluid is obtained by subtracting the sum of fluid saturations of the other phases from 1.

For the injection well, the residual oil saturation of each phase except the injection phase can be obtained directly according to the phase permeability curve, which is considered as the residual oil saturation of the injection well. Therefore, the saturation for the injection phase may be obtained by subtracting the sum of residual oil saturations of the other phases from 1.

During the well shut-in period, there is neither production in the production well nor injection phase in the injection well, to which the above process is not applicable. The saturation of the production well during well shut-in exhibits a complex change law, but will eventually be reflected at the well opening time $t_{K+1}^{open}$. It is considered that the saturation changes linearly from time $t_0^{open}$ to time $t_{K+1}^{open}$, so the unknown saturation of production well during well shut-in time $t_k^{shut}$ can be completed by isometric interpolation as follows:

$$S^j_{prod,t_k^{shut}} = S^j_{prod,t_k^{open}} + \frac{k\left(S^j_{prod,t_k^{shut}} - S^j_{prod,t_k^{open}}\right)}{K+1}$$

In the formula, $S_{prod,t_0^{open}}^j$ open denotes a saturation of a $j^{th}$ phase of the production well at moment $t_0^{open}$, $S_{prod,t_k^{shut}}^j$ denotes a saturation of a $j^{th}$ phase of the production well at moment $t_k^{shut}$, and $S_{prod,t_{K+1}^{open}}^{open}$ denotes a saturation of a $j^{th}$ phase of the production well at moment $t_{K+1}^{open}$.

During the well shut-in period of the injection well, given that the bottom hole flow pressure is not lower than the formation pressure, the fluid around the wellhole will not flow into the wellhole, so it is considered that the saturation of each phase is consistent with the saturation at moment $t_0^{open}$, which is given by the following equation:

$$S_{int,t_k^{shut}}^j = S_{inj,t_0^{open}}^j$$

In the formula, $S_{inj,t_0^{open}}^j$ denotes a saturation at a $j^{th}$ phase of the injection well at moment $t_0^{open}$, and $S_{inj,t_k^{shut}}^j$ phase denotes a saturation of a $j^{th}$ phase of the injection well at moment $t_k^{shut}$.

S1015, complete historical saturation distribution data of blocks by using a Kriging method.

In an optional embodiment, on the basis of the boundary conditions and physical constraints, introduce the influence of logging saturation data, and complete historical saturation distribution data of blocks by using the Kriging method.

Although logging saturation data are often small in size, such data contain crucial practical information about the reservoir, so in S1015, it is necessary to predict the distribution of Kriging interpolation fields with the influence of logging saturation data taken into consideration.

Further, complete historical saturation distribution data of blocks. Based on the saturation data of each well, acquire saturation distribution data of blocks by using a Kriging method. Before interpolation, set the initial saturation of blocks as the boundary condition. Constrain the sum of saturation of all phases at each location point to 1. If there are any other physical constraints on the reservoir, the same setting applies. In addition, logging saturation data, if any, should be placed according to corresponding well location coordinates in the reservoir, so that the logging saturation affects the distribution of surrounding field saturation. After all the conditions are properly set, conduct interpolation, and complete saturation distribution data of blocks.

In an optional embodiment, S101 includes:

normalize the relevant historical dynamic and static monitor data of oil wells in the target reservoir, and establish the complete data sets according to the normalized relevant historical dynamic and static monitor data of oil wells in the target reservoir.

Data normalization. As the scale of reservoir data varies greatly, the use of data of different scales may induce numerical problems. In order to eliminate the influence of dimensions and improve the convergence speed of the model, Min-Max Scaling is used to normalize the data, which also helps to accelerate the convergence speed of the model. A normalization equation is as follows:

$$\hat{x}_i = \frac{x_i - \min\{x_i\}}{\max\{x_i\} - \min\{x_i\}}$$

Where $x_i$ denotes ith data before normalization, $\hat{x}_i$ denotes ith data after normalization, $\min\{x_i\}$ is a minimum value of $x_i$, and $\max\{x_i\}$ is a maximum value of $x_i$.

The data set after data cleaning, completion and normalization is defined as D.

In an optional embodiment, the process of establishing complete data sets according to relevant historical dynamic and static monitor data of oil wells in a target reservoir includes:

divide the complete data sets to obtain a preset proportion of data sets as training sets, and the rest proportion of data sets as remaining test sets.

By way of example, it is possible to take first 90% of the data sets as training sets and the remaining 10% as test sets.

S102, train and test a long and short-term memory (LSTM) model using the complete data sets.

The LSTM model of each production well is trained using the training sets and tested on the test sets. The outputs of the model are expected to include the production of various kinds of fluids, such as oil production, gas production and water production. The dynamic inputs of LSTM include daily oil production, daily gas production, daily water production, choke size and well opening and well shut-in status, the static inputs are set to include porosity, permeability and initial water saturation, and outputs include daily oil production, daily gas production and daily water production. The accuracy of the model training is evaluated by using an evaluation index $R^2$.

S103, predict production of a single well at a preset moment by using the trained LSTM model.

The LSTM model is used as a production feature learner, and after input and output setting is completed, the LSTM model is trained and tested.

By way of example, on the test sets, the time point at which the remaining oil distribution needs to be predicted is determined as T+1, and it is considered that the remaining oil distribution needs to be predicted at moment T+1, so the current time is T, and data sets at moment T and data sets before moment T are already known. The production at moment T+1 is predicted by using the trained LSTM model.

Figure 3A:
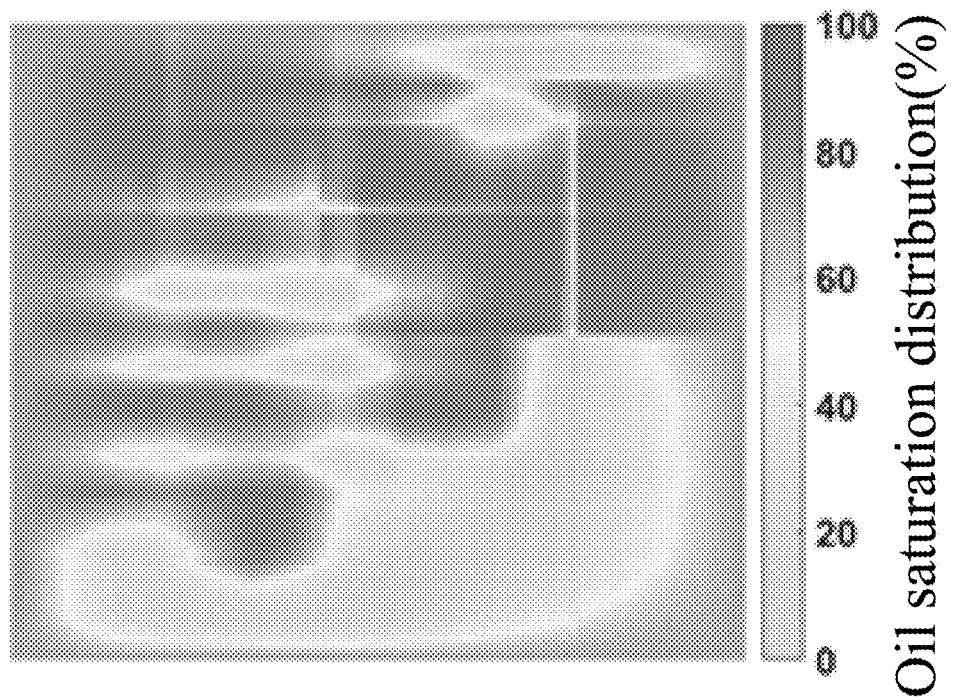
FIG. 3A and FIG. 3B are diagrams showing prediction results and benchmark results of oil saturation distribution, where
Figure 3B:
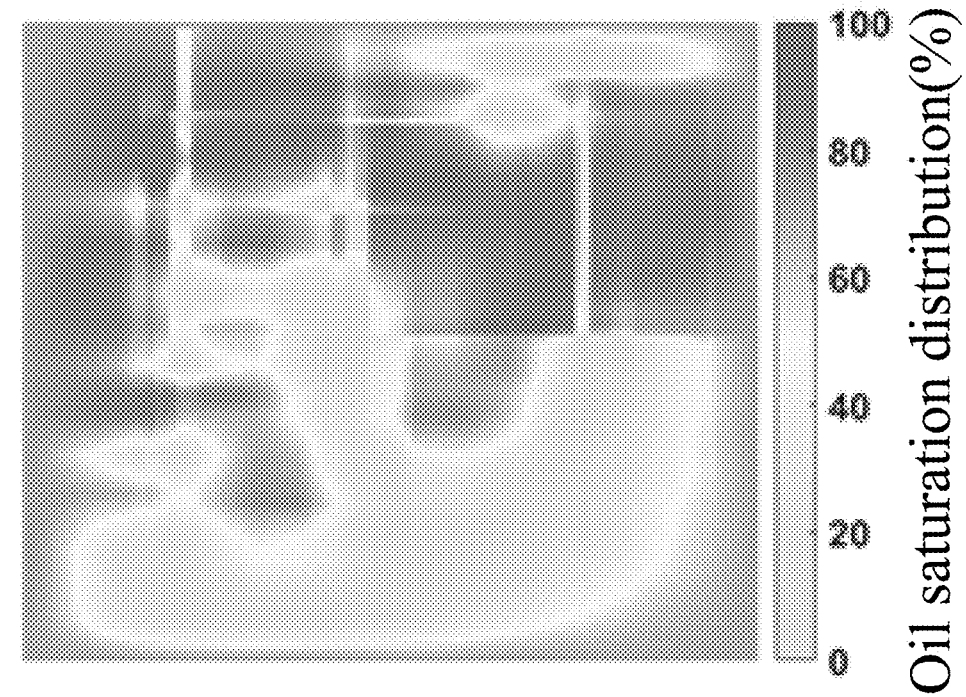
Figure 4A:
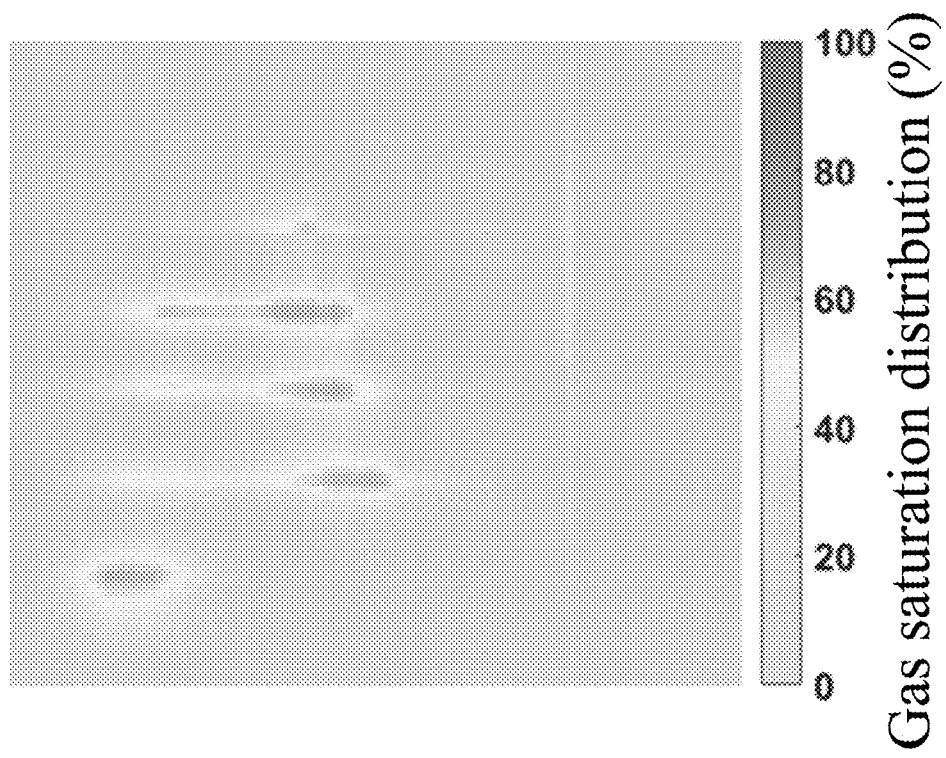
FIG. 4A and FIG. 4B are diagrams showing prediction results and benchmark results of gas saturation distribution, where
Figure 4B:
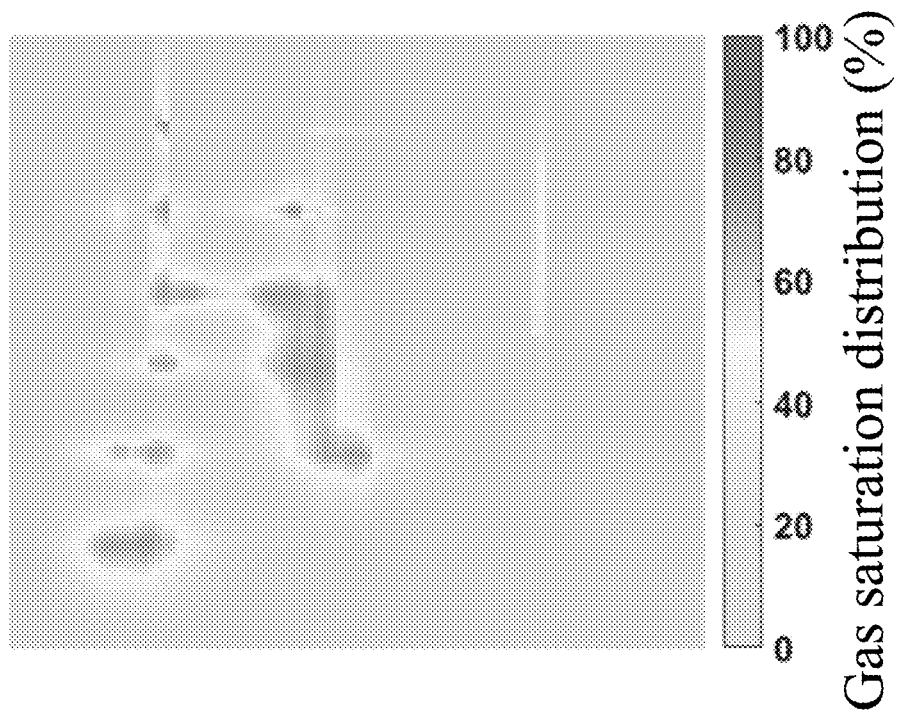
Figure 5A:
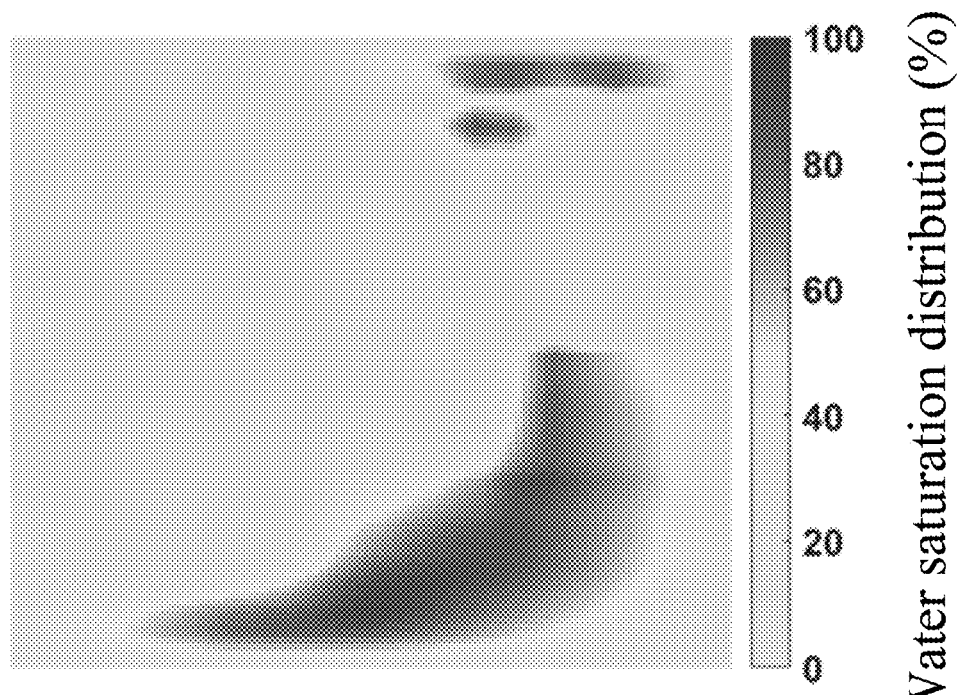
FIG. 5A and FIG. 5B are diagrams showing prediction results and benchmark results of water saturation distribution, where
Figure 5B:
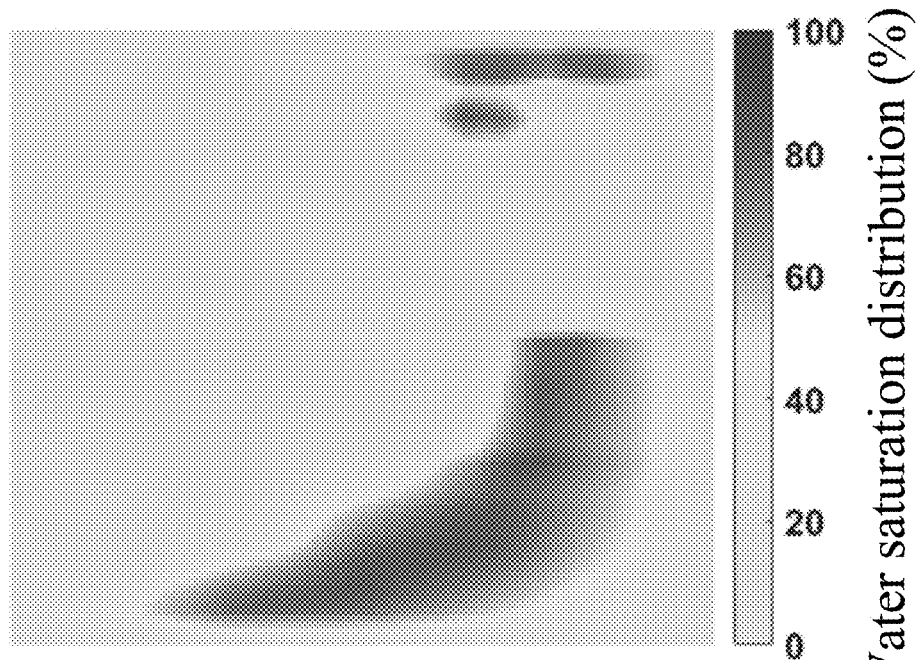

Referring to FIGS. 3-5, FIG. 3 is a diagram showing prediction results and benchmark results of oil saturation distribution; FIG. 4 is a diagram showing prediction results and benchmark results of gas saturation distribution; and FIG. 5 is a diagram showing prediction results and benchmark results of water saturation distribution. As can be seen from the comparison between the prediction results and the benchmark results, by adoption of the method for predicting remaining oil distribution based on historical and predictive reservoir knowledge provided in the embodiments of the present disclosure, the remaining oil saturation field distribution of the target reservoir can be predicted with high precision, and the problem of remaining oil distribution prediction can be well resolved.

S104, acquire three-phase saturations of the single well at the preset moment based on the production predicting results and experience of reservoir experts.

In an optional embodiment, the process of acquire three-phase saturations of the single well at a preset moment based on the production predicting results and experience of reservoir experts includes:

acquire three-phase saturations of the single production well at the preset moment based on the production predicting results and experience of reservoir experts.

At S104, during the process of calculating three-phase saturations of a single production well at moment T+1, consider whether the production well is shut in or not at moment T+1, different calculation methods should be adopted in different cases.

Further, by way of example, calculate three-phase saturations of a single production well at moment T+1. The trained LSTM model is used to predict the daily oil production, daily gas production and daily water production of a single production well at moment T+1. If it is predicted that the three productions of the single production well at moment T+1 are all 0, it means that the well is shut in at moment T+1, during which the formation fluid flows less. Since moment T+1 is adjacent to moment T, the differences in oil saturation distribution, gas saturation distribution and water saturation distribution at moment T+1 and moment T are considered ignorable. Therefore, according to the well location coordinates of the well, the three-phase saturations obtained from the saturation field at moment T are taken as the saturations of the well at moment T+1.

If not all the daily oil production, daily gas production and daily water production of the single well at moment T+1 are 0, then the three-phase saturations at moment T+1 are calculated according to the production predicting results and the process at the fifth step. It is worth mentioning that the LSTM prediction results may show cases where the daily oil production is 0 but the daily gas production or daily water production is not 0, which, however, does not accord with the reality of the reservoir. It is considered that the LSTM model with this result fails to learn the production variation characteristics of the well, and it is expected to return to S102 to retrain the LSTM model of the well.

In an optional embodiment, the process of acquire a three-phase saturation of the single well at a preset moment based on the production predicting results and experience of reservoir experts further includes:

judge well shut-in/well opening and injection conditions of an injection well at the preset moment according to a reservoir development management plan, and acquire three-phase saturation of the single injection well at the preset moment according to reservoir analysis.

According to a reservoir development and management plan, the well opening and well shut-in status of the injection well and the type of injected fluid at moment T+1 are determined, and the respective calculation methods should be adopted in different cases. Further, by way of example, calculate three-phase saturations of a single injection well at moment T+1. The well opening and well shut-in status of the injection well and the type of injected fluid at moment T+1 may be acquired according to the reservoir development and management plan. When it is decided in the production field that the injection well be shut in at moment T+1, the fluid near the well is unlikely to flow into the wellhole since the bottom hole flow pressure is not lower than the formation pressure. Therefore, the three-phase saturations of the well at moment T+1 are considered to be the same as those at moment T. Likewise, when it is decided in the production field that the injection condition at moment T be maintained at moment T+1, it is also considered that the three-phase saturations of the well at moment T+1 are considered to be the same as those at moment T. If it is decided to adjust the type of injected fluid at moment T+1, the three-phase saturations at moment T+1 are calculated according to the process at the fifth step.

In an optional embodiment, the process of acquire a three-phase saturation of the single well at a preset moment based on the production predicting results and experience of reservoir experts further includes:

according to the three-phase saturation of the single production well at the preset moment, as well as three-phase saturation of the single injection well at the preset moment, set boundary conditions and physical constraints, and derive the oil-gas-water three-phase saturation field at the preset moment using Kriging interpolation.

It should be noted that the physical constraints include but are not limited to: the sum of three-phase saturations at the same grid point is 1. According to the actual situation of the reservoir, if there are other physical constraints, it is necessary to set the constraints for Kriging interpolation process.

Further, by way of example, remaining oil distribution at moment T+1 is derived by interpolation. Remaining oil distribution at moment T+1 is obtained by using the Kriging method. Before interpolation, the three-phase saturation data of each well are placed at its well location coordinates, the outer boundary condition is set as the initial saturation condition of blocks, and the sum of the three-phase saturations of each grid point is set to 1. In addition, if other constraint conditions need to be set at the reservoir site, the corresponding constraints for the interpolation process are also required. The prediction results of remaining oil distribution are output and compared with the benchmark results in the test sets, and the prediction precision is evaluated using $R^2$ index.

Further, the method provided in the embodiments of the present disclosure also includes evaluate the prediction result of the remaining oil distribution using the evaluation index $R^2$.

On the other hand, the present disclosure provides a device for predicting remaining oil distribution based on historical and predictive reservoir knowledge, where device includes a readable storage medium having computer program stored therein, and the computer program is configured to implement the method according to any one of the foregoing methods.

The foregoing are descriptions of preferred embodiments of the present disclosure. It should be noted that a person of ordinary skill in the art can make several improvements and modifications without departing from the principle of the present disclosure, and such improvements and modifications should be deemed as falling within the protection scope of the present disclosure.

What is claimed is:

1. A method for predicting remaining oil distribution based on historical and predictive reservoir knowledge, comprising:
    establishing complete data sets according to relevant historical dynamic and static monitor data of oil wells in a target reservoir;
    training and testing a long and short-term memory (LSTM) model using the complete data sets;
    predicting production of a single well at a preset moment by using the trained LSTM model;
    acquiring three-phase saturations of the single well at the preset moment based on the production predicting results and experience of reservoir experts; and
    according to the three-phase saturations of the single well, setting boundary conditions and physical constraints for the reservoir, and deriving an oil-gas-water three-phase saturation field at the preset moment using Kriging interpolation to obtain a prediction result of remaining oil distribution in the target reservoir;
    wherein the process of acquiring three-phase saturations of the single well at the preset moment based on the production predicting results and experience of reservoir experts comprises:
        acquiring three-phase saturations of the single production well at the preset moment based on the production predicting results and experience of reservoir experts;
        judging well shut-in/well opening and injection conditions of an injection well at the preset moment according to a reservoir development management plan, and acquiring the three-phase saturations of the single injection well at the preset moment according to reservoir analysis.

2. The method according to claim 1, wherein the process of establishing complete data sets according to relevant historical dynamic and static monitor data of oil wells in a target reservoir comprises:
    acquiring historical dynamic and static data monitored from the field of the target reservoir to form initial data sets; and
    cleaning the initial data sets according to the experience of reservoir experts to acquire the dynamic and static monitor data sets of the target reservoir.

3. The method according to claim 1, wherein the process of establishing complete data sets according to relevant historical dynamic and static monitor data of oil wells in a target reservoir comprises:
    completing historical wellhead pressure data of a single well by using a function fitting method;
    completing, according to a Bernoulli equation and analysis of change in reservoir formation pressure, historical bottom hole pressure data of the single well;
    completing historical pressure field distribution data of blocks by using a Kriging method;
    completing historical phase saturation data of the single well according to a relative permeability curve and flow analysis of formation fluid; and
    completing historical saturation distribution data of blocks by using a Kriging method.

4. The method according to claim 3, wherein the process of establishing complete data sets according to relevant historical dynamic and static monitor data of oil wells in a target reservoir comprises:
    completing, from two aspects of well opening and well shut-in, historical bottom hole pressure data of a single well according to a Bernoulli equation and analysis of change in reservoir formation pressure;
    considering whether the on-way resistance loss of fluid flow can be ignored and the setting of boundary conditions for blocks, and completing historical pressure field distribution data of blocks by using a Kriging method;
    simplifying a percolation process of a horizontal well to plane radial flow and spherical centripetal flow, and a percolation process of a vertical well to plane radial flow, and completing, from two aspects of well opening and well shut-in, historical phase saturation data of a single well according to a relative permeability curve and flow analysis of formation fluid; and
    on the basis of the boundary conditions and physical constraints, introducing the influence of logging saturation data, and completing historical saturation distribution data of blocks by using the Kriging method.

5. The method according to claim 1, wherein the process of establishing complete data sets according to relevant historical dynamic and static monitor data of oil wells in a target reservoir comprises:
    normalizing the relevant historical dynamic and static monitor data of oil wells in the target reservoir, and establishing the complete data sets according to the normalized relevant historical dynamic and static monitor data of oil wells.

6. The method according to claim 5, wherein the process of establishing complete data sets according to relevant historical dynamic and static monitor data of oil wells in a target reservoir comprises:
    dividing the complete data sets to obtain a preset proportion of data sets as training sets, and the rest proportion of data sets as remaining test sets.

7. The method according to claim 1, wherein the process of acquiring three-phase saturations of the single well at the preset moment based on the production predicting results and experience of reservoir experts further comprises:
    according to the three-phase saturations of the single production well at the preset moment, as well as three-phase saturations of the single injection well at the preset moment, setting boundary conditions and physical constraints, and deriving the oil-gas-water three-phase saturation field at the preset moment using Kriging interpolation.

8. A device for predicting remaining oil distribution based on historical and predictive reservoir knowledge, wherein the device comprises a readable storage medium having a computer program stored therein, and the computer program is configured to implement the method according to claim 1.

9. The device according to claim 8, wherein the process of establishing complete data sets according to relevant historical dynamic and static monitor data of oil wells in a target reservoir comprises:
    acquiring historical dynamic and static data monitored from the field of the target reservoir to form initial data sets; and
    cleaning the initial data sets according to the experience of reservoir experts to acquire the dynamic and static monitor data sets of the target reservoir.

10. The device according to claim 8, wherein the process of establishing complete data sets according to relevant historical dynamic and static monitor data of oil wells in a target reservoir comprises:
    completing historical wellhead pressure data of a single well by using a function fitting method;
    completing, according to a Bernoulli equation and analysis of change in reservoir formation pressure, historical bottom hole pressure data of the single well;
    completing historical pressure field distribution data of blocks by using a Kriging method;
    completing historical phase saturation data of the single well according to a relative permeability curve and flow analysis of formation fluid; and
    completing historical saturation distribution data of blocks by using a Kriging method.

11. The device according to claim 10, wherein the process of establishing complete data sets according to relevant historical dynamic and static monitor data of oil wells in a target reservoir comprises:
    completing, from two aspects of well opening and well shut-in, historical bottom hole pressure data of a single well according to a Bernoulli equation and analysis of change in reservoir formation pressure;
    considering whether the on-way resistance loss of fluid flow can be ignored and the setting of boundary conditions for blocks, and completing historical pressure field distribution data of blocks by using a Kriging method;
    simplifying a percolation process of a horizontal well to plane radial flow and spherical centripetal flow, and a percolation process of a vertical well to plane radial flow, and completing, from two aspects of well opening and well shut-in, historical phase saturation data of a single well according to a relative permeability curve and flow analysis of formation fluid; and
    on the basis of the boundary conditions and physical constraints, introducing the influence of logging saturation data, and completing historical saturation distribution data of blocks by using the Kriging method.

12. The device according to claim 8, wherein the process of establishing complete data sets according to relevant historical dynamic and static monitor data of oil wells in a target reservoir comprises:
    normalizing the relevant historical dynamic and static monitor data of oil wells in the target reservoir, and establishing the complete data sets according to the normalized relevant historical dynamic and static monitor data of oil wells.

13. The device according to claim 12, wherein the process of establishing complete data sets according to relevant historical dynamic and static monitor data of oil wells in a target reservoir comprises:
    dividing the complete data sets to obtain a preset proportion of data sets as training sets, and the rest proportion of data sets as remaining test sets.

14. The device according to claim 8, wherein the process of acquiring three-phase saturations of the single well at the preset moment based on the production predicting results and experience of reservoir experts further comprises:
    according to the three-phase saturations of the single production well at the preset moment, as well as three-phase saturations of the single injection well at the preset moment, setting boundary conditions and physical constraints, and deriving the oil-gas-water three-phase saturation field at the preset moment using Kriging interpolation.

\* \* \* \* \*